United States Patent
Klingenhöfer et al.

(10) Patent No.: US 12,518,542 B2
(45) Date of Patent: Jan. 6, 2026

(54) DEVICE FOR DETERMINING A TOPOGRAPHY OF A VEHICLE ENVIRONMENT, VEHICLE AND METHOD

(71) Applicant: CARIAD SE, Wolfsburg (DE)

(72) Inventors: Steffen Klingenhöfer, Berlin (DE); Maximilian Jansen, Berlin (DE)

(73) Assignee: CARIAD SE, Wolfsburg (DE)

( * ) Notice: Subject to any disclaimer, the term of this patent is extended or adjusted under 35 U.S.C. 154(b) by 421 days.

(21) Appl. No.: 18/060,506

(22) Filed: Nov. 30, 2022

(65) Prior Publication Data

US 2023/0186638 A1    Jun. 15, 2023

(30) Foreign Application Priority Data

Dec. 14, 2021  (DE) ...................... 10 2021 133 089.0

(51) Int. Cl.
*G06V 20/56* (2022.01)
*G06T 7/50* (2017.01)
*G06V 10/82* (2022.01)

(52) U.S. Cl.
CPC ............... *G06V 20/56* (2022.01); *G06T 7/50* (2017.01); *G06V 10/82* (2022.01); *G06T 2207/20081* (2013.01); *G06T 2207/20084* (2013.01)

(58) Field of Classification Search
CPC ........ G06V 20/56; G06V 20/70; G06V 10/82; G06T 7/50; G06T 17/00;
(Continued)

(56) References Cited

U.S. PATENT DOCUMENTS

2012/0027258 A1* 2/2012 Uchida ...................... G06T 7/20
382/103
2019/0286153 A1* 9/2019 Rankawat ............ G05D 1/0246
(Continued)

FOREIGN PATENT DOCUMENTS

DE      102019119162 A1   1/2020
DE      112018002143 T5   1/2020
(Continued)

OTHER PUBLICATIONS

Dhall et al, Real-time 3D Traffic Cone Detection for Autonomous Driving, 2019, arXiv:1902.02394v2, pp. 1-8. (Year: 2019).*
(Continued)

*Primary Examiner* — Kathleen M Broughton
(74) *Attorney, Agent, or Firm* — Seed Intellectual Property Law Group LLP

(57) ABSTRACT

A detection device for determining a topography of a vehicle environment comprises a camera unit which is configured to detect at least one image of the surroundings of the vehicle environment, wherein the respective image of the surroundings comprises pixels arranged at respective image coordinates of the image of the surroundings. It is provided that the detection device comprises an evaluation unit which is configured to process the respective image of the surroundings according to a predetermined height determination method, wherein the image of the surroundings in the predetermined height determination method is fed to a first artificial neural network which is trained to assign respective height values to the respective pixels of the respective image of the surroundings in a world coordinate system of the vehicle environment with respect to a predetermined horizontal plane.

16 Claims, 4 Drawing Sheets

(58) Field of Classification Search
CPC ........... G06T 2207/20081; G06T 2207/20084; G01B 11/24; G01B 11/245; G01S 15/86; G01S 15/8993; G01S 17/86; G01S 17/894
See application file for complete search history.

(56) References Cited

U.S. PATENT DOCUMENTS

| | | |
|---|---|---|
| 2019/0325595 A1 | 10/2019 | Stein et al. |
| 2020/0218979 A1* | 7/2020 | Kwon ................ G06N 3/08 |
| 2020/0380316 A1 | 12/2020 | Lee et al. |
| 2021/0149408 A1* | 5/2021 | Dodson .............. G06N 3/08 |
| 2023/0033470 A1* | 2/2023 | Wehr ................. G06T 7/579 |
| 2023/0145701 A1* | 5/2023 | Parchami ........ G06N 3/0464 |
| | | 382/103 |

FOREIGN PATENT DOCUMENTS

| | | | |
|---|---|---|---|
| EP | 3627378 A1 | 3/2020 | |
| WO | WO-2013035612 A1 * | 3/2013 | ............. G01S 17/89 |
| WO | WO-2019162327 A2 * | 8/2019 | ............... G01C 3/12 |

OTHER PUBLICATIONS

Wang et al, A Monocular Ranging Algorithm for Detecting Illegal Vehicle Jumping, 2017, International Conference on Green Informatics, pp. 1-6. (Year: 2017).*

* cited by examiner

DEVICE FOR DETERMINING A TOPOGRAPHY OF A VEHICLE ENVIRONMENT, VEHICLE AND METHOD

BACKGROUND

Technical Field

Embodiments of the invention relate to a device for determining a topography of a vehicle environment, a vehicle comprising a device for determining a topography of a vehicle environment, and a method for determining a topography of a vehicle environment.

Description of the Related Art

For automated driving, an understanding of the three-dimensional structure of the vehicle environment is of crucial importance. For this purpose, classical camera-based methods such as, for example, structure-from-motion methods or stereo camera methods are used: these methods rely on multiple images of the surroundings of a vehicle environment and make intensive use of computational power. In recent years, machine learning-based methods have been developed that are capable of providing a pixel-precise estimate of the distance to a camera unit of a world coordinate of a vehicle environment that underlies a given pixel of the image of the surroundings. These methods include so-called monocular depth methods.

For autonomous driving, it is of fundamental importance to determine information relating to the topography of the vehicle environment in order, for example, to distinguish navigable areas ("open spaces") of a road from non-navigable areas of the road or to detect objects in the road, such as, for example, bumpers that may have fallen off. The topography describes a totality of the positions of the world coordinates in the vehicle environment of the vehicle. The respective position may comprise a respective height value of the world coordinate relative to a ground surface of the vehicle environment and/or a distance from the world coordinate to the camera unit.

EP 3 627 378 A1 describes a system and a method for automatic detection for a vehicle of unstructured objects in a roadway, in particular for a vehicle with a driver assistance system.

The system is intended to classify objects as navigable or non-navigable by determining a height of the object with respect to the roadway, which is considered to be the ground level. The system comprises a determination module configured to determine a prominent portion of the image as a candidate object, and a depth module configured to determine a depth value of the candidate object. To compute the depth value, it is necessary that the candidate object is first recognized before the depth value is determined. The depth value is calculated by a trained neural network or by a structure from motion method.

US 2020/0380316 A1 describes systems and methods for estimating the height of an object from a monocular image. The system is configured to determine the size of the object, in particular its height, using a trained machine learning algorithm. The method comprises the step of detecting a candidate object, processing the portion of the image relating to the candidate object by cropping and/or rescaling it, and sending the thus processed image of the candidate object to the trained machine learning algorithm to determine the size of the object. The machine learning algorithm is trained using depth data from a depth sensor such as a LiDAR (light imaging, detection and ranging).

In the aforementioned methods, a candidate object must be detected before its size and height can be calculated.

BRIEF SUMMARY

Some embodiments provide a method which enables a simpler determination of depth or height data of a vehicle environment.

Some embodiments relate to a detection device for determining a topography of a vehicle environment. The detection device comprises a camera unit which is configured to detect at least one image of the surroundings of the vehicle environment. The respective image of the surroundings comprises pixels arranged at respective image coordinates of the image. In other words, the camera unit of the detection device is configured to detect at least one area of the vehicle environment in a respective image of the surroundings. The image of the surroundings comprises the pixels. The pixels detected by the camera unit may be projections of respective world coordinates of the vehicle environment onto an image plane of the image of the surroundings. The pixels can thus be projections of the respective world coordinates from a three-dimensional space in a three-dimensional coordinate system onto a two-dimensional image plane of the respective sensor unit in an image coordinate system. The image of the surroundings may, for example, be a pixel graphic. The coordinate system of the vehicle is also referred to as the world coordinate system. To enable a transformation between the two coordinate systems, it is necessary to detect a rotation between the camera coordinate system and the world coordinate system. This rotation can be described by rotation matrices or Euler angles. Roll-pitch-yaw-angle is widely used in the context of use of Euler angles. These can respectively refer to the longitudinal axis, the transverse axis, and the vertical axis of the camera and/or of the vehicle.

It is provided that the detection device comprises an evaluation unit configured to process the respective image of the surroundings according to a predetermined height determination method, wherein in the predetermined height determination method the image of the surroundings is fed to a first artificial neural network which is trained to assign to the respective pixels of the respective image of the surroundings respective height values in a world coordinate system of the vehicle environment, this with respect to a predetermined horizontal plane. In other words, it is provided that the respective image of the surroundings that is detected is evaluated by the evaluation unit of the detection device. The evaluation unit is configured to perform the predetermined height determination method in order to determine the respective height values for the respective pixels of the image of the surroundings.

In this context, the height values are described in the world coordinate system, which is related to the vehicle environment of the vehicle. The height value determined for the respective pixel describes the height of the world coordinate in the vehicle environment on which the pixel is based. It is provided in the predetermined height determination method, that the image of the surroundings with the pixels is fed to the first artificial neural network. The first artificial neural network may be a neural network that may be trained according to a predetermined training method for determining the respective height values of the pixels. The first artificial neural network may assign the respective height value that assigns, to each of the pixels, a distance from the pixel in the world coordinate system with respect to a predetermined horizontal plane of the vehicle environment. The horizontal plane may be, for example, a horizontal plane below the vehicle. The height value may also be defined with respect to a further plane detected in the vehicle environment.

Here and hereinafter, an artificial neural network may be understood to be a software code that is stored on a computer-readable storage medium and represents one or more networked artificial neurons or alternatively can simulate their function. In this context, the software code may also include several software code components that may, for example, have different functions. In particular, an artificial neural network may implement a non-linear model or a non-linear algorithm that maps an input to an output, wherein the input is given by an input feature vector or sequence and the output may include, for example, an output category for a classification task, one or more predicted values, or a predicted sequence.

Some embodiments provide the advantage that height values of the vehicle environment may be recorded by evaluating a single image of the surroundings.

Some embodiments provide that the evaluation unit is configured to detect the pixels with a respective lateral resolution defined by the predetermined accuracy ranges. In other words, it is provided that the image of the surroundings comprises predetermined accuracy ranges, wherein the accuracy ranges define respective distances between the pixels. In other words, it is provided that the image of the surroundings comprises accuracy ranges whose lateral resolutions differ from each other. The lateral resolution refers to the distances between pixels in the respective accuracy ranges, wherein a higher lateral resolution describes smaller distances between pixels. It can be provided that an accuracy range, which comprises a lower half of the image of the surroundings, specifies smaller distances between the pixels than an accuracy range, which comprises an upper half of the image of the surroundings. This results in the advantage that accuracy ranges of the image of the surroundings that are of lesser importance for determining the height values and/or the depth values can be assigned a lower resolution so that they require fewer resources during evaluation than image regions that are of greater importance. It can be provided, for example, that for the determination of a course of the road, the accuracy range indicative of the road is more relevant than an accuracy range indicative of the buildings. In order to save computational resources, it can be provided that the accuracy range that is representative of the buildings is detected with larger distances between the pixels than the accuracy range of the image of the surroundings indicating the road.

Some embodiments provide that the detection device is configured to determine the height values of the pixels in predetermined accuracy ranges of the image of the surroundings in respective height value resolutions of the height values defined by the predetermined accuracy ranges. Some embodiments provide that the predetermined accuracy ranges define the respective height value resolutions of the height values. In other words, it is provided that the accuracy ranges of the image of the surroundings specify the height value resolution with which the height values for the pixels in the respective accuracy ranges are determined. It can, for example, be provided that in an accuracy range of the image of the surroundings, which indicates the street, a resolution of the height values is defined, which resolution specifies that the height values are determined to an accuracy of centimeters. An accuracy range which is indicative of buildings can provide that the height values are determined in an accuracy of decimeters or meters. This results in the advantage that the computational resources of the detection device can be concentrated on accuracy ranges that are relevant for an evaluation.

Some embodiments provide that the evaluation unit is configured to determine the height values determined according to the predetermined height determination method in respective height value resolutions, wherein the respective height value resolutions depend on a magnitude of the respective height value. It may be provided, for example, that the height values are determined and/or output by the evaluation unit in the different height value resolutions. It can be provided, for example, that the height value resolutions of the respective height values become smaller the larger the respective height value is. This has the advantage that height values that are of less relevance to distance determination than other height values are, for example, outputted with lower accuracy. It can also be provided that the height determination method is continued with lower accuracy as soon as it is determined during a method step that, for example, a predetermined threshold value is exceeded by the height value. This means, for example, that lower height values, such as those that can be determined for objects close to the ground, such as curbs or potholes, can be determined and/or output with a higher height value resolution than objects far from the ground. The height value resolution below the threshold value may, for example, be specified to an accuracy of one centimeter. The height value resolution above the threshold value, on the other hand, can be accurate to one decimeter or one meter.

Some embodiments provide that the detection device is configured to process the respective image of the surroundings according to a predetermined depth determination method. For this purpose, the evaluation unit may be configured to feed the image of the surroundings in the predetermined depth determination method to a second artificial neural network which is trained to assign to the pixels of the respective image of the surroundings respective distance values or depth values in the world coordinate system of the vehicle environment. The depth values are described in the world coordinate system, which is related to the vehicle environment of the vehicle. The depth value determined for the pixels thereby describes the distance/depth of the world coordinates in the vehicle environment on which the respective pixels are based. The depth can thereby be the distance that the respective world coordinate underlying the respective pixel lays away from the camera unit, in particular a distance running in a horizontal plane. In other words, the detection device is configured to evaluate the respective image of the surroundings according to the predetermined distance determination method or the depth determination method in order to determine the respective depth values for the respective pixels. The depth values can, for example, describe distances of the respective world coordinates to the camera unit in the world coordinate system of the vehicle environment. The predetermined second artificial neural network may, for example, be trained according to a predetermined training method, wherein the second artificial neural network may be fed with images of the surroundings and associated detected depth values in the training method. The second artificial neural network can determine the respective depth values for the respective pixels on the basis of the training. The advantage of this further development is that the detection device can also determine the depth values of the pixels in addition to the determined height values.

Some embodiments provide that the evaluation unit is configured to determine the depth values determined according to the predetermined depth determination method in respective depth value resolutions, wherein the respective depth value resolutions depend on a magnitude of the respective depth value. It may, for example, be provided that the depth values are determined or output by the evaluation unit in the different depth value resolutions. It may, for example, be provided that the depth resolutions of the respective depth values become smaller the larger the respective depth value is. This results in the advantage that depth values that are less relevant for distance determination than other depth values are, for example, output with lower accuracy. It may also be provided that the depth determination method is pursued with lower accuracy as soon as it is determined during a method step that, for example, a respective predetermined threshold value is exceeded by the depth value. The depth value resolution below a predetermined threshold value can, for example, be specified to an accuracy of one centimeter. In contrast, the depth value resolution above the threshold value may be accurate to one decimeter or one meter.

Some embodiments provide that the evaluation unit is configured to determine the depth values of the pixels in the predetermined accuracy ranges in respective depth value resolutions of the depth values defined by the predetermined accuracy ranges. Some embodiments provide that the predetermined accuracy ranges define respective depth value resolutions of the depth values. In other words, it is provided that the accuracy ranges of the image of the surroundings specify the accuracy with which the depth values are determined for the pixels that are located in the respective accuracy range. It may, for example, be provided that in an accuracy range that includes a parked car, a higher accuracy of the depth values can be specified in order to reliably determine a distance to the car, for example, for a parking assistant. An accuracy range which shows a distant object, on the other hand, can be assigned a lower accuracy for the depth values since determining exact distance values for the associated accuracy range is not relevant for the parking assistant when performing a parking maneuver.

Some embodiments provide that the detection device is configured to determine a travel path for the vehicle from the height values and/or the depth values, according to a predetermined path determination method. In other words, the detection device is configured to determine a path in a navigable area of the vehicle environment for the vehicle. The detection device is, for example, configured to determine a navigable area based on the topography that is determined. This means that the navigable area can also be determined independently of conventional semantic segmentation or object recognition methods. The detection device is thereby configured to determine the area in which no obstacles appear. The obstacles can be identified by means of the topography that is detected.

Some embodiments provide that the evaluation unit is configured to check the respective height values of respective pixels for compatibility with the depth values of the respective pixels according to a predetermined test method. In other words, it is provided that at least some height values of the respective pixels are checked for compatibility with the depth values of the respective pixels by the evaluation unit. It may, for example, be provided that coordinates of the pixel in the world coordinate system are determined from the position of one of the pixels in the image of the surroundings and the determined height value of the pixel. For the pixel, coordinates of the pixel in the world coordinate system can also be determined from the location of the pixel in the image of the surroundings and the determined depth value of the pixel. The coordinates of the pixel in the world coordinate system determined via the height value can be compared with the coordinates of the pixel in the world coordinate system determined via the depth value in the predetermined test method. In so doing, a distance between the two determined coordinates can, for example, be determined. If the distance is below a predetermined threshold value, the height value and the depth value can be evaluated as compatible with each other.

Some embodiments provide that the evaluation unit is configured to evaluate the height values and/or the depth values of the pixels according to a predetermined object recognition method in order to recognize predetermined objects in the vehicle environment. In the case of the predetermined object recognition method, it can be, for example, a predetermined semantic segmentation method, which is configured to assign the pixels of the image of the surroundings to a predetermined semantic class based on the determined height values and/or the determined depth values. It can also be a prior art method which is configured to identify the predetermined objects in data point clouds. The predetermined semantic class may concern, for example, houses, vehicles, navigable surfaces, curbs or other objects. This results in the advantage that objects in the vehicle environment can be detected using the height values and/or the depth values.

Some embodiments relate to a vehicle that comprises a detection device for detecting a topography of a vehicle environment. The vehicle described herein may be configured as a motor vehicle, in particular as a passenger car or truck, or as a passenger bus or motorcycle.

Some embodiments relate to a method for operating a detection device for detecting a topography of a vehicle environment. In the method, at least one camera unit of the detection device detects at least one respective image of the surroundings of the vehicle environment. The respective image of the surroundings comprises pixels arranged at respective image coordinates of the image of the surroundings. It is provided that an evaluation unit of the detection device processes the respective image of the surroundings according to a predetermined height determination method, wherein the image of the surroundings in the predetermined height determination method is fed to a first artificial neural network which is trained to assign to the respective pixels of the respective image of the surroundings respective height values in a world coordinate system of the vehicle environment, with respect to a predetermined horizontal plane. It is provided that the respective height values are assigned to the respective pixels of the image of the surroundings and the assigned height values are output by the detection device.

Some embodiments relate to a method for teaching a first artificial neural network. It is provided that at least one image of the surroundings of a vehicle environment is detected by a camera unit of a detection device. The respective image of the surroundings comprises pixels arranged at respective image coordinates of the image of the surroundings. An environment detection unit detects respective height values of world coordinates of the vehicle environment in a world coordinate system of the vehicle environment with respect to a predetermined horizontal plane of the vehicle environment. An evaluation unit assigns the respective world coordinates underlying the respective pixels. In this manner, the respective height value of the respective world coordinates can be assigned to the respective pixel. The determination of the world coordinates underlying the respective pixels can be based on geometric calculations. The image of the surroundings comprising the pixels and the determined height values are fed to a first artificial neural network. The first neural network updates a model that enables the determination of the height values for the pixels.

A further development provides that the environment detection unit detects respective depth values of the world coordinates of the vehicle environment in the world coordinate system of the vehicle environment which describe a distance from the pixel in world coordinates to the camera unit. The respective world coordinates which underlie the respective pixels are assigned by the evaluation unit. In so doing, the respective depth value of the respective world coordinates can be assigned to the respective pixel. The determination of the world coordinates underlying the respective pixels can be based on geometric calculations. The image of the surroundings, comprising the pixels and the depth values that are determined, are fed to a second artificial neural network. The second neural network updates a model that enables the determination of the depth values of the respective pixels.

A further embodiment provides that the first neural network and the second neural network are trained in parallel in a multitask learning training method. In other words, it is provided that the multitask learning training method is applied to train the first neural network and the second neural network. The first neural network and the second neural network may, for example, have identical base layers in their respective models. The base layers of the respective models may be non-specific, so that it is possible to build specific layers on top of them, which may be provided for determining the height values or the depth values. The first neural network and the second neural network may, for example, only differ from each other in the specific layers. In the case of training of the first neural network, the base layers, which can also be used by the second neural network, and the specific layers of the first neural network, which are only used by the first neural network, can thereby be trained. In the case of training of the second neural network, the base layers, which can also be used by the first neural network, and the specific layers of the second neural network, which are only used by the second neural network, can thereby be trained.

Some embodiments include an evaluation unit for the detection device. The evaluation unit may comprise a data processing device or a processor device which is configured to perform an embodiment of the method described herein. For this purpose, the processor device may comprise at least one microprocessor and/or at least one microcontroller and/or at least one FPGA (Field Programmable Gate Array) and/or at least one DSP (Digital Signal Processor). Moreover, the processor device may comprise program code which is configured to perform the embodiment of the method described herein when executed by the processor device. The program code may be stored in a data memory of the processor device.

Some embodiments also include further developments of the vehicle described herein and of the methods described herein, which have features as already described in connection with the further developments of the detection device described herein. For this reason, the corresponding further developments of the vehicle described herein and the methods described herein are not described once again here.

Some embodiments also encompass combinations of the features of the described embodiments. Thus, some embodiments also encompass realizations each having a combination of the features of more than one of the described embodiments, provided that the embodiments have not been described as mutually exclusive.

DETAILED DESCRIPTION

In the embodiments described herein, the described components of the embodiments each represent individual features that are to be considered independently of one another. Therefore, the disclosure is intended to include combinations of the features of the embodiments other than those shown. Furthermore, the described embodiments may also be supplemented by any of the further previously described features.

In the figures, identical reference signs indicate elements with identical functions.

Figure 1:
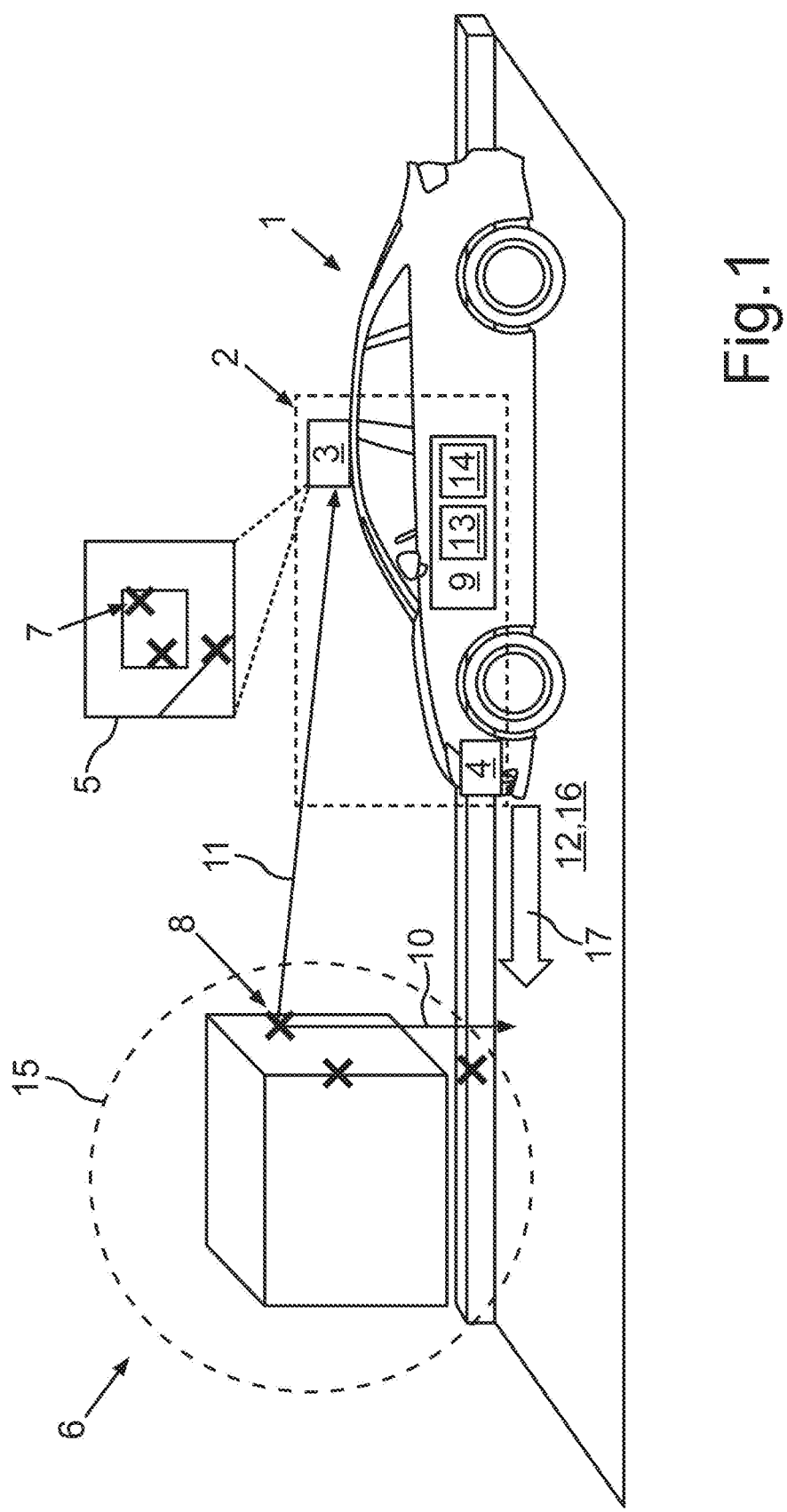
FIG. 1 shows a schematic representation of a vehicle, which has a detection device.

FIG. 1 shows a schematic representation of a vehicle that has a detection device. The vehicle 1 can, for example, be a car or truck. The detection device 2 can, for example, have a camera unit 3 and an environment detection unit 4. The camera unit 3 may, for example, be a monocular camera. The camera unit 3 may be configured to detect a respective image of the surroundings 5 of a vehicle environment 6 of the vehicle 1. The image of the surroundings 5 may be formed as a pixel graphic and may have pixels 7 corresponding to world coordinates 8 in the vehicle environment 6. The detection device 2 can have an evaluation unit 9 that can be configured to receive the at least one respective image of the surroundings 5 from the at least one camera unit 3 and to evaluate it according to a predetermined height determination method.

The height determination method may include a height measurement method for determining a height value 10 of a respective pixel 7 and a depth determination method for determining a depth value 11. The height value 10 of a respective pixel 7 may be referenced to a predetermined plane 12 in the vehicle environment 6. This may be, for example, a predetermined area below the vehicle 1. The depth value 11 may be a distance from the pixel 7 to the camera unit 3 or in general to a sensor device. For determining the depth values 11 in the predetermined depth determination method, the image of the surroundings 5 may be assigned to a second artificial neural network 14, which may be trained to determine the depth values 11 of the pixels 7. For determining the height values 10, the image of the surroundings 5 can be assigned to a first neural network 13 which may be trained to determine the height values 10 of the respective pixels 7.

The determined height values 10 and/or depth values 11 can be used to identify objects 15 in the vehicle environment 6. The specified 12 objects 15 can be, for example, buildings, pedestrians, other road users, vehicles 1 or curbs. The identification of the objects 15 may be performed, for example, by semantic segmentation methods. It may be provided that the height values 10 or the depth values 11 are used to determine a navigable area 16 for the vehicle 1 and to determine a travel path 17 for the vehicle 1. It can be provided that the detection device 2 can have the environment detection unit 4 for training the first artificial neural network 13 and/or the second artificial neural network 14. This can be configured, for example, as a lidar sensor unit, as a stereo camera unit 3, as an ultrasound sensor unit or as a monocular camera, which can be configured to determine height values 10 or depth values 11 using structure-from-motion method. The environment detection unit 4 can be configured to assign the respective height values 10 or depth values 11 to the pixels 7 of the image of the surroundings 5 of the vehicle environment 6. The determined height values 10 and/or depth values 11 can be passed on to the first and/or second artificial neural network 13, 14 together with a recorded image of the surroundings 5, wherein the height values 10 and/or the depth values 11 can be assigned to the pixels 7 of the image of the surroundings 5. Such an assignment is, for example, also known as labeling. By performing the training several times, it may thus be possible to train a model or levels 12 of the neural networks 13, 14, which enable a determination of the height values 10 and/or the depth values 11 for respective pixels 7 of the image of the surroundings 5.

Figure 2:
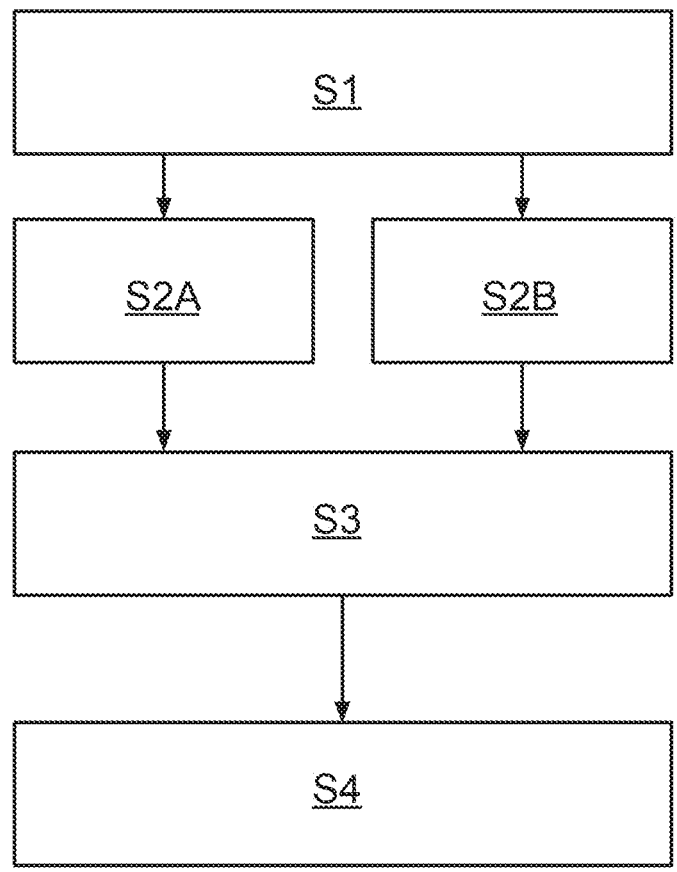
FIG. 2 shows a schematic representation of a sequence of a method for operating a detection device.

FIG. 2 shows a schematic representation of a sequence of a method for operating a detection device. In a first step S1, it can be provided that a camera unit 3 of the detection device 2 can detect an image of the surroundings 5 of a vehicle environment 6.

In a step S2A, the image of the surroundings 5 can be transmitted to an evaluation unit 9, which can perform a predetermined height determination method to determine respective height values 10 of the respective pixels 7 of the image of the surroundings 5. In the predetermined height determination method, it may be provided that the image of the surroundings 5 with the pixels 7 is transferred to a first neural network 13, which may be trained to assign height values 10 to pixels 7 of the image of the surroundings 5. The first neural network 13 may determine the height values 10 of the pixels 7, for example, with respect to a predetermined plane 12.

In addition or alternatively to the step S2A, in a step S2B running parallel to this step, the image of the surroundings 5 with the pixels 7 may be determined at the evaluation unit 9, which evaluation unit performs a predetermined depth determination method to assign respective depth values 11 to the respective pixels 7. The depth values 11 can, for example, describe a distance from a world coordinate 8 assigned to the respective pixel 7 to the camera unit 3. In the predetermined depth determination method, the image of the surroundings 5 with the pixels 7 may be fed to a second artificial neural network 14, which may be trained to assign the depth values 11. The determined depth values 11 can be output by the detection device 2.

In a step S3, it is possible, for example, that based on the height values 10 and/or the depth values 11, the coordinates of the world coordinates 8 assigned to the pixels 7 can be derived and thereby a topography of the vehicle environment 6 can be determined.

In a step S4, it may be provided that objects 15 are determined in a predetermined object recognition method. This can, for example, be accomplished by means of semantic segmentation methods. In step S4, a navigable area 16 can be determined which can be driven over by the vehicle 1. It can be provided that a travel path 17 for the vehicle 1 can additionally be determined, which vehicle can run within the navigable area.

The vehicle 1 can be controlled according to the determined travel path 17 in order to guide it along the travel path 17.

Figure 3:
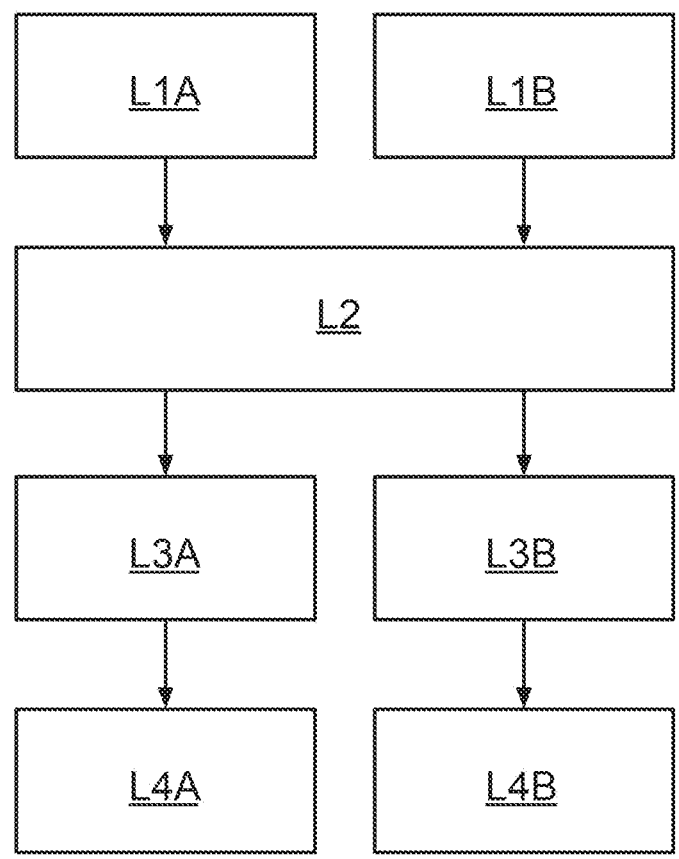
FIG. 3 shows a schematic representation of a sequence of a method for training a first and a second artificial neural network.

FIG. 3 shows a schematic representation of a sequence of a method for training a first and a second artificial neural network.

In a first step L1A, a camera unit 3 of a detection device 2 of a vehicle 1 may detect an image of the surroundings 5 of a vehicle environment 6, comprising pixels 7.

In parallel to this, in a step L1B, height values 10 depth values 11 of world coordinates 8 of the vehicle environment 6 can be determined by an environment detection unit 4 of the detection device 2. This can be accomplished, for example, by means of lidar, radar, ultrasound or stereographic camera techniques. In so doing, a respective height value 10 and/or a respective depth value 11 can be detected for each of the world coordinates 8 of the vehicle environment 6.

In a step L2, the images of the surroundings 5 with the pixels 7 can be merged together with the detected world coordinates 8.

In a step L3A, the images of the surroundings 5 with the pixels 7 can be assigned according to a predetermined assignment method to the world coordinates 8 and the respective height values 10. In a step L4A, the pixels 7 and the assigned height values 10 can be fed to a first neural network 13, which can thereinafter update a model or network levels of the first neural network 13 in a height determination method.

In a step L3B, the world coordinates 8 of the vehicle environment 6 and respective depth values 11 of the world coordinates 8 can be assigned to the respective pixels 7 of the image of the surroundings 5. The respective depth values 11 and the respective pixels 7 can be fed in a step L4B to a second neural network 14, which can then update a model or network layers of the second neural network 14 in a depth determination method.

It may be provided that so-called multitask learning is applied. In this case, the fact that basic layers of the neural networks 13, 14 can be trained together can be used due to the small differences between the two neural networks 13, 14.

Figure 4:
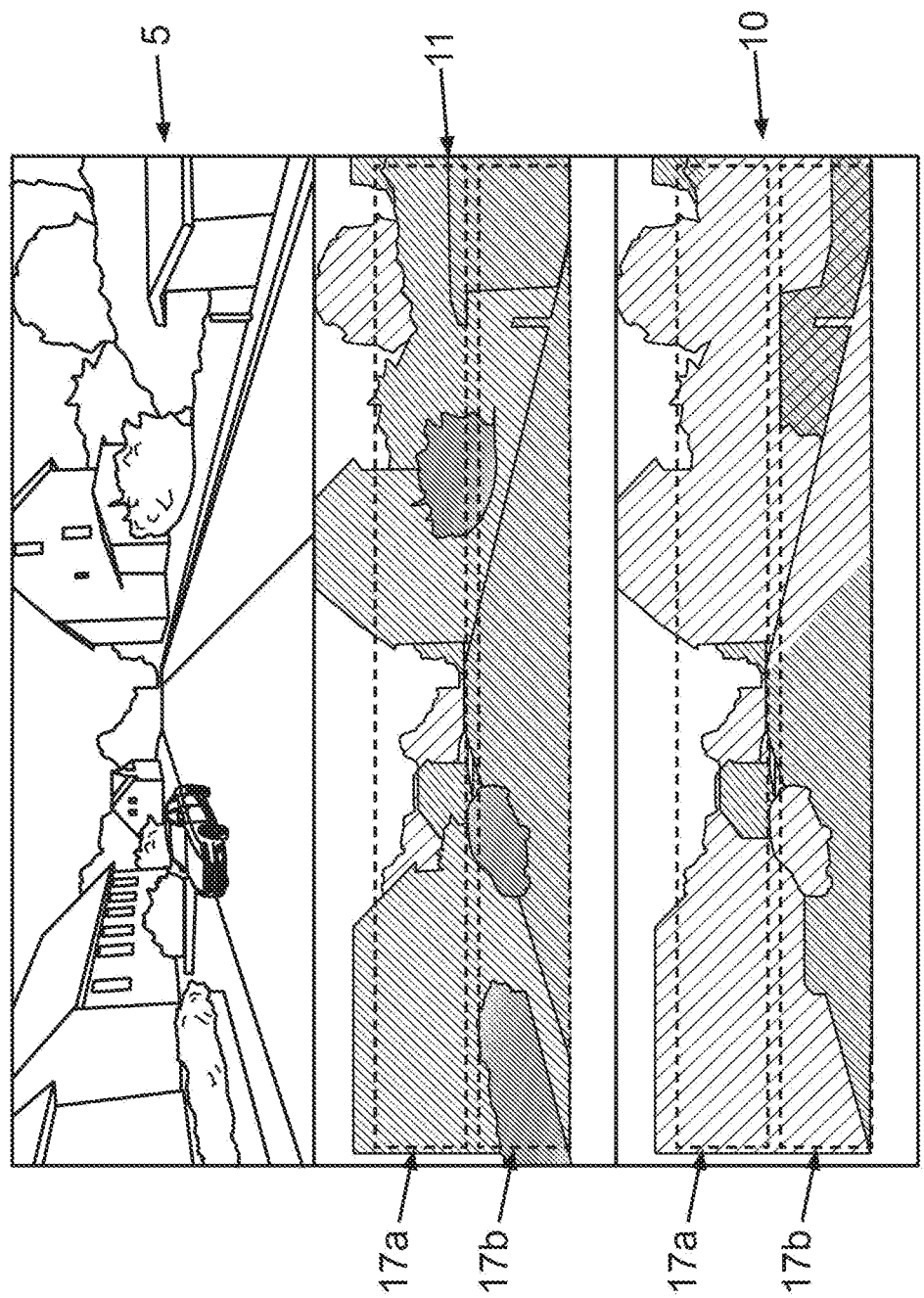
FIG. 4 shows a schematic representation of an image of the surroundings and depth values and height values determined for pixels of the image of the surroundings.

FIG. 4 shows a schematic representation of an image of the surroundings as well as depth values and height values determined for pixels of the image of the surroundings. The upper image shows an image of the surroundings 5 of a vehicle environment 6 of a vehicle 1, which was detected by a camera unit 3 of a detection device 2. The middle image shows the depth values 11 determined for the image of the surroundings 5. The lower image shows the height values 10 determined for the image of the surroundings 5. The image of the surroundings 5 may comprise two accuracy ranges 17a, 17b. The two accuracy ranges 17a, 17b may specify the lateral resolution with which the pixels 7 in the respective one of the accuracy ranges 17a, 17b are detected by the detection device 2. The accuracy ranges 17a, 17b can also specify the depth value resolution with which the depth values 11 of the pixels 7 are determined by the evaluation unit 9 and/or the height value resolution with which the height values 10 of the pixels 7 are determined by the evaluation unit 9. The upper accuracy range 17a can specify lower resolutions inasmuch as the corresponding area of the image of the surroundings 5 does not comprise any objects that are relevant for vehicle guidance. The lower accuracy range 17*b*, on the other hand, can specify higher resolutions inasmuch as the corresponding area of the image of the surroundings 5 comprises objects that are relevant for vehicle guidance, such as curbs. In order to be able to reliably identify these objects by the evaluation unit 9 in the object recognition method, resolutions to an accuracy of centimeters can, for example, be specified for the height values 10 and the depth values 11.

The described method makes it possible to determine the height of each pixel 7 in a single image, regardless of whether it belongs to an object 15 or not. The height value 10 can be used to estimate a clear path for the vehicle 1, in particular by determining the height of any curbs that may be present. Additionally or alternatively, the height value 10 may be sent as additional information to other systems, such as an object recognition system or a semantic segmentation system. In the case of an object recognition system, the height values 10 may, for example, help to define bounding boxes and/or the size of objects 15. In a semantic segmentation system, the height value 10 can be used to better classify the clear path.

Overall, the examples show how a method for determining height values of individual pixels from a single image of the surroundings can be provided.

German patent application no. 10 2021 133089.0, filed Dec. 14, 2021, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A detection device for determining a topography of a vehicle environment, comprising:
 a camera that, in operation, detects an image of surroundings of the vehicle environment,
 wherein the image of the surroundings comprises pixels arranged at respective image coordinates of the image of the surroundings,
 wherein the image of the surroundings comprises a plurality of predetermined accuracy ranges,
 wherein each accuracy range of the predetermined accuracy ranges defines a distance between the pixels included in the accuracy range, and
 wherein the distance between the pixels included in one of the predetermined accuracy ranges in a lower half of the image of the surroundings of the vehicle environment is smaller than the distance between the pixels included in one of the predetermined accuracy ranges in an upper half of the image of the surroundings of the vehicle environment,
 a processor; and
 a memory storing program code that, when executed by the processor, causes the detection device to:
  determine respective height values in a world coordinate system of the vehicle environment with respect to a predetermined horizontal plane for the pixels,
  wherein the image of the surroundings is fed to a first artificial neural network which is trained to determine the respective height values in the world coordinate system of the vehicle environment with respect to the predetermined horizontal plane for the pixels of the image of the surroundings.

2. The detection device according to claim 1, wherein the program code, when executed by the processor, causes the detection device to detect the pixels in the predetermined accuracy ranges of the image of the surroundings in respective lateral resolutions defined by the predetermined accuracy ranges.

3. The detection device according to claim 2, wherein the program code, when executed by the processor, causes the detection device to determine the respective height values of the pixels in the predetermined accuracy ranges of the image of the surroundings in respective height value resolutions of the respective height values defined by the predetermined accuracy ranges.

4. The detection device according to claim 1, wherein the program code, when executed by the processor, causes the detection device to determine the respective height values in respective height value resolutions, wherein the respective height value resolutions are dependent on a magnitude of the respective height value.

5. The detection device according to claim 1, wherein the program code, when executed by the processor, causes the detection device to:
 determine respective depth values in a world coordinate system of the vehicle environment for the pixels, wherein the respective depth values describe a distance from the pixel in world coordinates to the camera,
 wherein the image of the surroundings is fed to a second artificial neural network which is trained to assign to the pixels of the image of the surroundings the respective depth values in the world coordinate system of the vehicle environment.

6. The detection device according to claim 5, wherein the program code, when executed by the processor, causes the detection device to determine the respective depth values in respective depth value resolutions, and wherein the respective depth value resolutions depend on a magnitude of the respective depth values.

7. The detection device according to claim 5, wherein the detection device is configured to determine the respective depth values of the pixels in the predetermined accuracy ranges in respective depth value resolutions of the respective depth values defined by the predetermined accuracy ranges.

8. The detection device according to claim 5, wherein the program code, when executed by the processor, causes the detection device to determine a travel path for the vehicle from the respective height values and/or the respective depth values.

9. The detection device according to claim 5, wherein the program code, when executed by the processor, causes the detection device to check the respective height values for compatibility with the respective depth values.

10. The detection device according to claim 5, wherein the program code, when executed by the processor, causes the detection device to evaluate the respective height values and/or the respective depth values of the pixels and identify predetermined objects in the vehicle environment.

11. The detection device according to claim 5, wherein the distance is a horizontal distance.

12. A vehicle comprising a detection device according to claim 1.

13. A method for operation of a detection device for determining a topography of a vehicle environment, the detection device including: a camera that detects an one image of surroundings of the vehicle environment, wherein the image of the surroundings comprises pixels arranged at respective image coordinates of the image of the surroundings, wherein the detection device includes a processor and a memory storing program code that, when executed by the detection device, causes the detection device to determine respective height values in a world coordinate system of the vehicle environment with respect to a predetermined horizontal plane for the pixels, wherein the image of the surroundings is fed to a first artificial neural network which is trained to determine the respective height values in the world coordinate system of the vehicle environment with respect to the predetermined horizontal plane for the pixels of the image of the surroundings, the method comprising:

detecting, by the camera, an image of the surroundings of the vehicle environment,
        wherein the respective image of the surroundings comprises pixels arranged at respective image coordinates of the image of the surroundings,
        wherein the image of the surroundings comprises a plurality of predetermined accuracy ranges,
        wherein each accuracy range of the predetermined accuracy ranges defines a distance between the pixels included in the accuracy range, and
        wherein the distance between the pixels included in one of the predetermined accuracy ranges in a lower half of the image of the surroundings of the vehicle environment is smaller than the distance between the pixels included in one of the predetermined accuracy ranges in an upper half of the image of the surroundings of the vehicle environment;
    determining, by the detection device, respective height values of the respective pixels,
        wherein the image of the surroundings is fed to the first artificial neural network which is trained to assign respective height values to the pixels of the image of the surroundings in a world coordinate system of the vehicle environment with respect to the predetermined horizontal plane, and
        wherein the respective height values are assigned to the pixels of the image.

14. A method for teaching a first artificial neural network, comprising:

detecting, by a camera of a detection device, an image of surroundings of a vehicle environment,
        wherein the image of the surroundings comprises pixels arranged at respective image coordinates of the image of the surroundings,
        wherein the image of the surroundings comprises a plurality of predetermined accuracy ranges,
        wherein each accuracy range of the predetermined accuracy ranges defines a distance between the pixels included in the accuracy range, and
        wherein the distance between the pixels included in one of the predetermined accuracy ranges in a lower half of the image of the surroundings of the vehicle environment is smaller than the distance between the pixels included in one of the predetermined accuracy ranges in an upper half of the image of the surroundings of the vehicle environment;
    detecting, by the detection device, respective height values of world coordinates of the vehicle environment are detected in a world coordinate system of the vehicle environment with respect to a predetermined horizontal plane,
        wherein the respective pixels are assigned respective world coordinates, and
        wherein the respective height values of the respective world coordinates are assigned to the pixels of the image of the surroundings, and the pixels of the image of the surroundings with the respective height values are fed to the first artificial neural network.

15. The method according to claim 14, further comprising:

detecting, by the detection device, respective depth values of world coordinates of the vehicle environment in the world coordinate system of the vehicle environment, wherein the world coordinates describe a distance from the pixel in world coordinates to the camera,
    wherein the respective pixels are assigned respective world coordinates, and
    wherein the respective depth values of the pixels of the image of the surroundings are assigned to the respective world coordinates, and the pixels of the image of the surroundings with the respective depth values are fed to a second artificial neural network.

16. The method according to claim 15, wherein the first artificial neural network, and the second artificial neural network, are trained together.

\* \* \* \* \*